March 16, 1948. E. E. HUDSON 2,437,820
ROTARY SHAFT CONSTRUCTION
Filed March 18, 1944
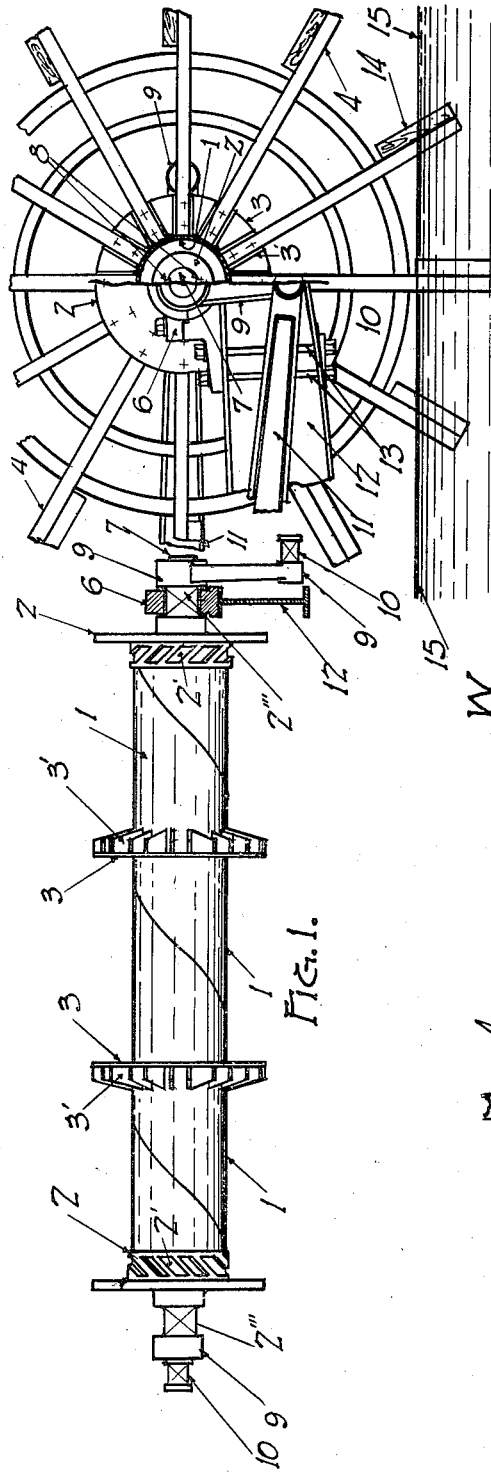
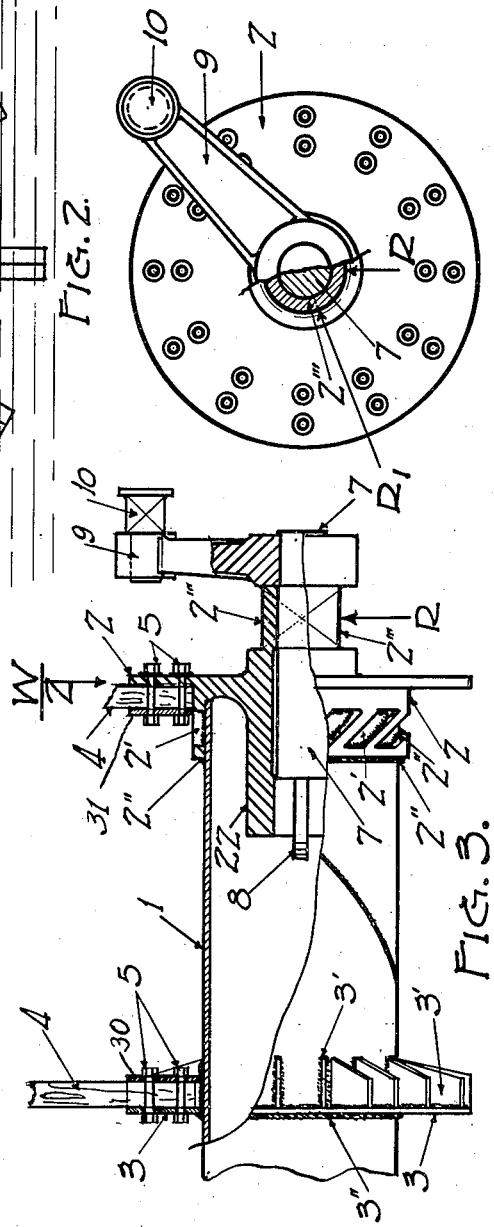
Inventor
EDWIN B. HUDSON
By Samuel Klvortz
Attorney Patented Mar. 16, 1948

2,437,820

UNITED STATES PATENT OFFICE 2,437,820

ROTARY SHAFT CONSTRUCTION

Edwin B. Hudson, Middletown, Ohio

Application March 18, 1944, Serial No. 527,103

7 Claims. (Cl. 74—596)

This invention relates to a rotary hollow shaft construction and more particularly to an improved design for a steamboat wheel shaft.

It is the object of the present invention to provide a rotary hollow shaft construction, preferably fabricated from sheet steel, fitted with journals and connections for imparting rotary motion thereto, to obtain a construction which is strong, rugged and lasting.

It is a further object of the present invention to design a rotary shaft construction which is subjected to large shearing and torsional stresses and which effectively resists the deteriorating influences of such stresses over long periods of time.

It is a further object of the present invention to provide a rotary shaft construction which meets particularly well the needs of steamboat wheel shafts as generally used on stern wheel steamboats in use on the inland waterways of the United States. The conventional steamboat wheel shaft has proven unsatisfactory, although it has been in use for more than seventy-five years, and little effort has been made to improve the life of the shaft, which seldom lasts more than three to four years. The owners of such steamers, in order to secure a more continuous operation, are required to carry a spare shaft at all times for replacement. This practice is expensive and does not insure continuous operation, as the boat has to be taken out of service to make a replacement in case of breakage. The loss of a shaft generally results in other damage such as the loss of either or both engines by what is termed by the river men as "the engine going through herself." Such engine repair may reach $5,000.00 to $10,000.00 in addition to the cost of the new wheel shaft. Furthermore, such breakdowns often occur many miles away from boat yards where repairs can be made.

The principal cause of failure of shafts of this type is the necessity for the transmission of a large amount of power at low speed, about 18 to 20 R. P. M., resulting in extremely high torque stresses.

The high concentration of stresses, both torque and shear, in the shaft at the inside face of the supporting bearing, causes the breakage at or near this point. The complete reversal of shear stresses at 18 to 20 times per minute and the operation of the shaft under corrosive conditions reduce the values of the safe working stresses which may be employed under more favorable conditions.

The invention proceeds upon the principle of separating the elements of the shaft at which the torque and shearing stresses are applied so that different portions of the shaft construction are capable of carrying these separate loads within safe limits. Thus, a full floating wheel shaft is obtained so that the weight of the wheel and the forces propelling the boat are carried by one pair of elements and the torque required to drive the wheel by a second pair of elements, each independent of the other and each executing the function for which it is particularly designed in a most efficient manner. The provision of a hollow shaft in accordance with the present invention results in the application of lower stresses to the separate parts of the shaft in consequence of the fact that it is much lighter than a conventional forged shaft with its tremendous total dead weight.

The above described objectives of the invention are best attained by a hollow rotary shaft having end castings welded to the opposite ends thereof, each of which castings is provided with a collar extending interiorly of the shaft and a journal exteriorly thereof, the latter being subjected to loadings of the weight of the wheel and the reaction of the propulsive force of the wheel in the course of its operation. The torque component is transmitted by means of a torque shaft extending through the journal and the collar, and which is connected to a portion of each end casting displaced from the point of application of the first-mentioned loadings.

Other objects and purposes will appear from the more detailed description of the invention following hereinafter, taken in conjunction with the accompanying drawing, wherein:

Fig. 1 is a front elevation of a full floating wheel shaft in accordance with the present invention;

Fig. 2 is an end elevation with certain parts in section of a wheel shaft carrying a water wheel adapted to be mounted on a steamboat for operation on a waterway;

Fig. 3 is an enlarged front elevation with certain parts in section of the water wheel construction at one end of the central shaft; and Fig. 4 is a right end elevation of Fig. 3 with certain parts in section.

In the drawing is shown a rotary hollow shaft 1 formed of rolled sheet metal, preferably steel, which is of cylindrical configuration, and which may be fabricated by a spiral weld. This shaft construction is characterized by great strength despite its comparative lightness. While the drawing shows a shaft of this type having a length approximately six times its diameter, these dimensions may vary in dependence upon the specific needs of different installations, but the invention is particularly applicable to the bearing and driving expedients for a shaft of this type having a length several times its diameter. End castings 2 are welded to the opposite ends of the tubular shaft and while these end members are referred to as castings, it is understood that they may be fabricated by any known foundry and machine shop practices. These end members are of substantially rigid construction in view of the heavy loads and stresses to which they are subjected. In order to obtain a strong joint, each end casting is provided with a circumferential flange overlying its respective end of the tubular shaft 1, and a plurality of openings 2', angularly disposed with respect to the axis of the shaft, are formed in the circumferential flange to provide a large number of welding joints 2" between the end casting and the tubular shaft including the complete circular weld at the end of the flange. The openings are preferably inclined at an angle of 45° which results in an overlapping of the welding lines on the opposed edges of the openings so that any bending tendencies at this point of the shaft are effectively eliminated.

In the construction of a shaft for the steamboat wheel, additional supports for the spokes of the wheel are provided by welding annular plates 3 at different points along the wheel which are backed along one face by the trapezoidal-shaped members 3' extending radially from the exterior surface of the tubular shaft at which points they are welded thereto and to the annular flange 3. The spokes of the wheel 4 are fitted into the pockets thus formed between adjacent radially disposed members 3' and the annular flange 3, which spokes are backed by removable rectangular plates 30 which are maintained in place by bolts 5 extending through the plates 3 and 30 with the wooden spokes 4 therein. The spokes or arms 4 carry buckets 14 which extend into the water 15, as shown in Fig. 2.

Wooden arms 4 are also fastened to the radially extending flange of the end castings 2 by means of bolts 5 extending through said flange and annular segments 31 formed in two or more pieces.

The end casting 2, shown in enlarged view in Fig. 3, is welded to each end of the shaft, as shown in Fig. 1. This casting is provided with a journal 2''', which is supported in journal bearing 6, as shown. End casting 2 carries the weight directly to the journal bearing 6, and is equivalent to W/2, where W is the weight of the steel assembly, which is equal to the reaction R (Figs. 3 and 4) when the wheel is stationary. However, when the wheel is rotating, reaction $R_1$ is composed of the component W/2 and the force P which moves the boat through the water. Reaction $R_1$ is in an angular position, which is dependent upon the relative values of W/2 and P.

In order to separate the points of the end castings at which the stresses are applied thereto, the torque loadings which are applied to the shaft for the purpose of imparting rotation thereto, are imposed at points laterally displaced from the journals 2'''. A collar 22 on each casting extends interiorly of the tubular shaft and the torque shaft 7 is pressed into the collar from beyond the journal end with suitable snug or interference fits at the journal and adjacent to the free end of the collar with a gap therebetween. The torque shaft is keyed into the collar by a pair of keys 8 disposed 180° apart (Fig. 2). The end of the torque shaft 7 is reduced slightly in cross-section and is adapted to have a crank arm 9 shrunk and keyed thereon. On the opposite end of the crank arm a crank pin 10 is provided for engagement with the corresponding engine pitman 11. Bearings 6 are supported by outriggers 12 extending from the stern of the boat and fastened by bolts 13.

As shown in Fig. 1, the crank 9 on one end of the shaft is angularly displaced from the crank on the other end of the shaft by 90°. Likewise the pair of keys 8 on one end of the shaft are displaced 90° relative to the pair of keys on the opposite end. The torque is transmitted by each of the torque shafts 7 to the respective end castings 2 at the inner ends of the collars 22 without stressing the journal end of the casting 2 at the vicinity of 2''', which carries only the stresses occasioned by the weight of the assembly W/2 or the combination of W/2 and the reaction of the propulsive force P when the boat is being propelled.

In view of the fact that the points of application of the stresses on the shaft have been separated, and furthermore in view of the lightness of the construction, the principal cause of failure of conventional wheel shafts is thereby avoided.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A hollow cylindrical shaft of a length several times its diameter, bearing and driving means for said shaft at the opposite ends thereof, and means for preventing mechanical failure of said shaft at said ends comprising a substantially rigid end member mounted on each end thereof having a collar extending interiorly of the shaft and a hollow journal extending exteriorly thereof, and a torque shaft passing through said journal with a snug fit and extending into said collar and rigidly connected to said member at said collar.

2. A full floating steamboat wheel shaft comprising a main hollow cylindrical body of a length several times its diameter, a substantially rigid end member provided with a circumferential flange overlying each end of said hollow body and welded thereto having an internal collar and a hollow journal arranged coaxially with said collar, and a torque shaft passing through each journal with a snug fit and extending into said collar and rigidly connected to said end member at said collar by means of a key and keyways.

3. A hollow cylindrical shaft formed of spirally welded rolled sheet steel, an end casting provided with a circumferential flange overlying the end of the hollow shaft and provided with a plurality of openings angularly disposed with respect to the axis of the shaft to form welded joints between the shaft and the free edge of the flange and the overlapping opposed edges of said openings, a collar extending interiorly of the shaft and a hollow journal extending exteriorly thereof, a torque shaft extending from beyond said journal and into said collar, and a plurality of keys for connecting said torque shaft to said casting at said collar.

4. A hollow cylindrical shaft formed of rolled sheet metal, and of a length several times its diameter, substantially rigid end members mounted on the opposite ends thereof, each having a collar extending interiorly of the shaft and a hollow journal extending exteriorly thereof, a torque shaft passing through each of said journals with a snug fit and into the respective collar and rigidly connected to the respective member at said collar, a crank arm connected to each torque shaft at the part thereof extending beyond the respective journal, said crank arms at the opposite ends of the shafts having a relative angular displacement of substantially 90°.

5. A hollow metallic shaft of a length several times its diameter, a substantially rigid end section affixed to one end thereof having an internal collar and a hollow journal arranged coaxially and displaced laterally relative to each other, and a torque shaft passing through said hollow journal with a snug fit and rigidly connected to said collar for driving engagement therewith.

6. A hollow cylindrical shaft comprising a main hollow cylindrical body of a length several times its diameter and substantially rigid end sections on the opposite ends thereof, each of said sections having an internal collar and a hollow journal arranged coaxially and displaced laterally relative to each other, and a torque shaft passing through each journal with a snug fit and rigidly connected to the respective collar.

7. A full floating steamboat wheel shaft comprising a main hollow cylindrical body of a length several times its diameter and substantially rigid end sections on the opposite ends thereof, each of said sections having an internal collar and a hollow journal arranged coaxially and displaced laterally relative to each other, a torque shaft passing through each journal with a snug fit and rigidly connected to the respective collar for driving engagement therebetween, and a crank arm connected to each of said torque shafts at the opposite ends of the steamboat wheel shaft, said crank arms having a relative displacement of approximately 90°.

EDWIN B. HUDSON.

REFERENCES CITED

The following references are of record in the file of this patent:

UNITED STATES PATENTS

| Number | Name | Date |
| --- | --- | --- |
| 243,897 | Hill | July 5, 1881 |
| 375,435 | Alden | Dec. 27, 1887 |
| 508,826 | Johnson et al. | Nov. 19, 1893 |
| 527,708 | McCorkindale | Oct. 16, 1894 |
| 733,222 | Liebert et al. | July 7, 1903 |
| 763,268 | Edwards | June 21, 1904 |
| 1,543,383 | Harris | June 23, 1925 |
| 2,059,794 | Jackson | Nov. 3, 1936 |
| 2,216,606 | Taylor | Oct. 1, 1940 |

FOREIGN PATENTS

| Number | Country | Date |
| --- | --- | --- |
| 498,053 | Germany | May 1, 1930 |